Nov. 23, 1948.  F. G. BACK  2,454,686
VARIFOCAL LENS FOR CAMERAS
Filed July 30, 1946  2 Sheets-Sheet 2
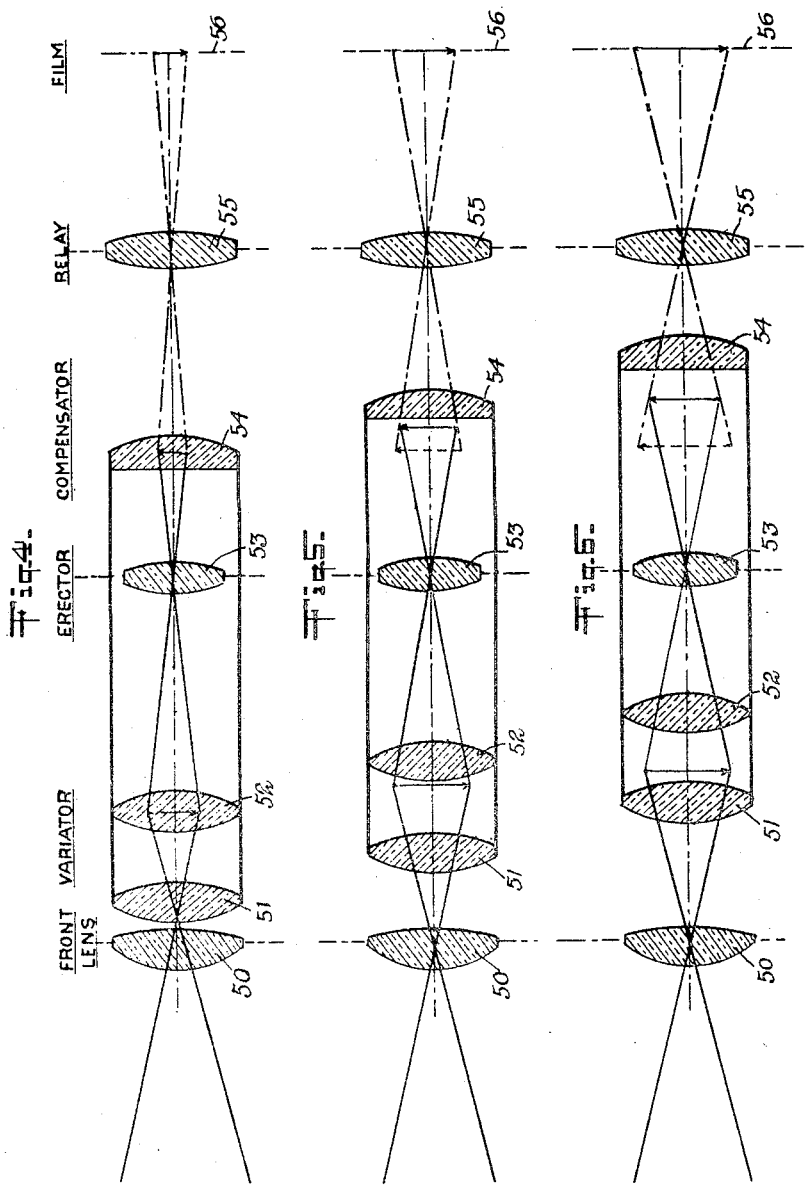
INVENTOR
Frank G. Back
BY
Munn, Liddy & Glaccum
ATTORNEYS Patented Nov. 23, 1948

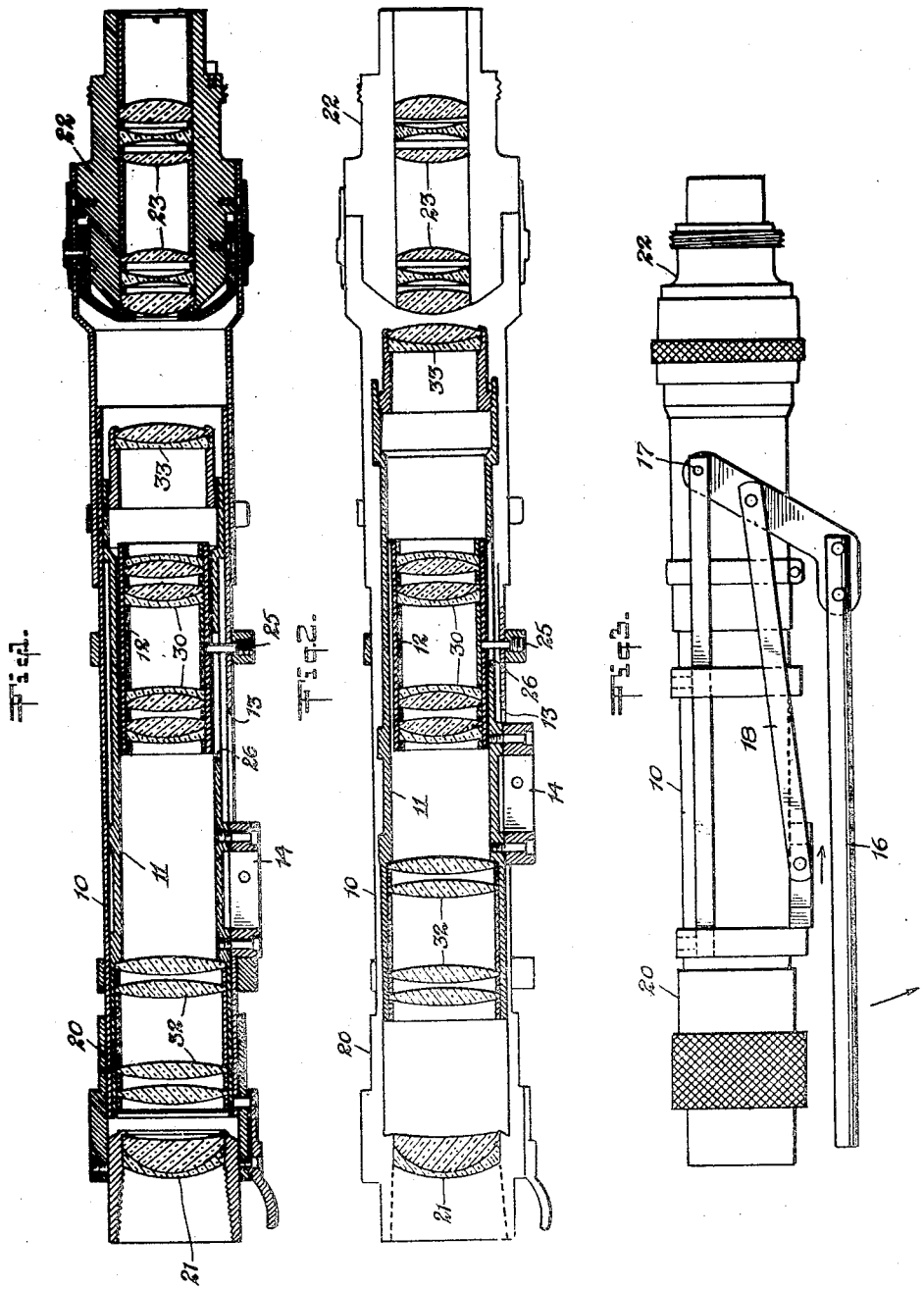

2,454,686

UNITED STATES PATENT OFFICE 2,454,686

VARIFOCAL LENS FOR CAMERAS

Frank G. Back, New York, N. Y.

Application July 30, 1946, Serial No. 687,135

7 Claims. (Cl. 88—57)

1

The invention relates to varifocal lenses for use in connection with moving picture cameras.

It is a conventional practice in the moving picture industry to provide zoom effects by the simple device of moving the camera toward or away from the object. To eliminate the need for such camera movement, varifocal lenses have been invented. These lenses provide different focal lengths to adapt the camera to the different and changing requirements of zooming. These varifocal lenses have been very unsatisfactory both from the point of view of manufacture and use.

The chief disadvantage of these varifocal lenses lies in the fact that it is virtually impossible to obtain an accurately focused image over the whole focal range. The spacing of the several component parts of these varifocal lenses is so critical that even a minute deviation throws the image entirely out of focus. Normal wear in the moving parts suffices to throw the system out of focus. In the present construction an accurately focused image may be obtained over the entire focal range. Another principal object of the present invention, therefore, is the provision of a varifocal lens which is self-focusing throughout the entire zoom shot.

Another object of the invention is the provision of a varifocal lens which is adaptable to any conventional moving picture camera.

A further object of the invention is the provision of a varifocal lens in which there is only one movable part (exclusive of the control members). Normal wear of the movable part relative to the stationary parts can result only in a slight change of the focal range, but it will in no way impair the quality of the image.

A preferred embodiment of this invention is shown in the accompanying drawings in which—

Fig. 1 is a longitudinal section through the entire device showing the movable lens system in forward position;

Fig. 2 is a schematic view showing the movable lens system in rear position;

Fig. 3 is a diagrammatic view showing the control mechanism by which the movable lens system is moved from one position to another;

Fig. 4 is a schematic view showing the movable lens system in forward position. This view is not accurate from the point of view of optics, and its sole purpose is to show movement of the movable lens system relative to the stationary lens system;

Fig. 5 is a view similar to that of Fig. 4 showing the movable lens system in an intermediate position; and

2

Fig. 6 is a view similar to that of Figs. 4 and 5, showing the movable lens system in rear position.

Referring now solely to Figs. 1 and 2, it will be seen that the device herein claimed is provided with an outer stationary barrel 10 in which is slidably mounted intermediate barrel 11 and an inner fixed barrel 12 mounted within the intermediate slidable barrel 11. The outer and inner barrels carry the fixed lens system; the intermediate barrel carries the movable lens system.

It will be seen that a window 13 is provided in the wall of the outer barrel 10. A bar 14 is connected to the intermediate barrel 11, and it will be noted that this bar extends through the window 13. A control lever or handle 16 is pivoted to the outer barrel 10 at 17, and it is connected to the bar 14 by means of a link construction 18. This may be seen in Fig. 3, and it will be understood that when the handle 16 is moved downwardly in the direction of the curved arrow in Fig. 3, the bar 14 and hence the intermediate slidable barrel 11 will be moved rearwardly in the direction of the horizontal arrow shown in said figure. When the handle 16 is moved in the opposite direction, the bar and the intermediate barrel will of course be moved forwardly. It is by means of this construction that the movable lens system which will hereinafter be described, is caused to engage in movement relative to the stationary lens system also hereinafter described.

Referring again to Figs. 1 and 2, it will be seen that a conventional sleeve or lens holder 20 is telescopically mounted on the outer barrel 10 at the front end of said barrel. This sleeve carries what may be designated as the front lens assembly 21 of the fixed lens system. At the rear end of outer barrel 10 is another lens holder 22 which holds what may be termed the relay assembly 23 of the fixed or stationary lens system.

The inner barrel 12 also holds elements of the fixed or stationary lens system, this inner barrel being fixed against movement relative to the outer barrel by means of stud 25 which connects the outer and inner barrels through a window 26 in the intermediate barrel 11. The lens system 30 in said fixed inner barrel 12 may be designated as the erector assembly. The front lens assembly, the relay assembly and the intermediate erector assembly comprise the stationary lens system of the device herein claimed.

At the front end of the movable intermediate barrel 11 is the variator lens assembly 32 and at the rear end of said intermediate barrel is the compensator lens assembly 33. It is between the variator and compensator assemblies that the erector assembly is disposed. There is no relative movement between the variator assembly and the compensator assembly. These two assemblies move as a single integral unit with the movement of the intermediate barrel 11.

A lens system in accordance with the present invention may comprise the following lenses:

A front lens assembly of +12¾ diopters, a variator lens assembly comprising a pair of lenses, each having two components to avoid aberration; each of said variator lenses being of +36¼ diopters and said lenses being spaced 22¾ mm. apart; an erector lens assembly having a power of +32¾ diopters and comprising four aplantic doublets to correct aberrations; a compensator lens having a power of +14 diopters and a relay assembly comprising two anastigmats with a power of +23½ diopters each.

Remembering that the variator and compensator assemblies are movable relative to the front lens, erector and relay assemblies and if a total travel of said movable assemblies from forward to rear position is 24 mm., the instrument will cover a range of 1 to 3. The equivalent focal length will be from 17 to 51 mm. This system is combined with a front element having a power of only +6⅜ diopters, the absolute focal range will be from 34 to 102 mm.

So that the theory behind the varifocal lens system, which is herein claimed and which has above been described, may be understood three schematic drawings, to wit, Figs. 4, 5 and 6 have been provided. These drawings as has already been indicated do not disclose a workable optical system. The lenses shown in these figures are intended to have no meaning other than to disconnect the several lens assemblies above described. The light rays shown in these figures are simply approximations by way of illustration of the light rays passing through the optical system shown in Figs. 1 and 2. It will be understood that there is no optical relationship between the light rays as shown in Figs. 4, 5 and 6, and the specific lenses therein shown.

The front lens 50 in conjunction with the front variator lens 51 forms inside the variator assembly an inverted real image of the object. In the foremost position of the variator as shown in Fig. 4, said real inverted image is found approximately inside the rear variator lens 52. This corresponds to the minimum equivalent focal length of the instrument. In the rearmost position of the variator, said image is formed between the front and rear elements of said variator assembly adjacent the front of said elements. This is shown in Fig. 6. In the intermediate position of the variator as shown in Fig. 5, the image is formed also between the front and rear elements of the variator but adjacent the rear of said elements.

The rear variator lens 52 in conjunction with the erector 53 and the compensator lens 54 forms a second upright image which is real when negative compensator lens is used and virtual when positive compensator lens is used. The relay system 55 serves to form a third real inverted image on the film, indicated by the dot and dash lines and designated by the character reference 56.

The stationary front element serves to focus the camera on objects closer than infinity. The variator changes the equivalent focal length of the lens system. Power and spacing of the variator components determine the range of the lens, i. e., the relation of the maximum and minimum focal lengths to each other. The weaker these lenses are and the wider they are spaced apart, the smaller the range becomes.

In the front position the stationary front lens 50 and the front variator lens 51 combine their power, while the rear variator lens 52 acts as a field lens. When the variator is moved backwards, the combined power of the front stationary lens and the front erector lens 51 decreases, while the rear variator lens 52 combines its power with the erector. As the variator is moved, the second real upright image formed by the erector as hereinabove described, changes its size. It also changes its position in the direction of the variator movement, although the movement of this second image is smaller than the movement of the variator. To eliminate this movement insofar as the film is concerned, it is necessary to introduce the compensator lens 54 which is linked to the variator as has also been described, and moves along with it.

This compensator lens has to have the following characteristics: If $m$ is the movement of the lens barrel and $t$ is the travel of the real image formed by the erector, $f$ the focal length of the compensator lens, and $L$ the distance from the real image to the compensator lens at the front position of the variator and $\overline{L'}$ distance of the image formed by the compensator lens of this real image then the equation, $$\frac{1}{L+(m-t)}+\frac{1}{f}=\frac{1}{L'+m}$$

has to be fulfilled for every position of the movable lens barrel. In other words, the focal length of the compensator lens and its spacing in the optical system has to be chosen in such a way that if the object distance of the lens is changed by an amount of $m-t$ then the image distance must change by the amount of $m$. Furthermore, an increase in the object distance has to correspond to an increase in the image distance and vice versa. From the foregoing it follows that either object or image has to be virtual because if both are real the image distance decreases when the object distance increases and vice versa. From the fact that the image travel is always smaller than the barrel movement it follows that if a negative compensating lens is used it has to be placed between the erector and the real image formed by the latter, while in case of a positive compensator lens it has to be placed behind the real image.

It is impossible to find a value for $L$, $\overline{L'}$ and $f$ where the above-mentioned equation holds true for every position of the barrel but by judiciously choosing these values this condition can be exactly fulfilled for three points while the deviations of the other points are so small that they fall within accepted optical tolerances.

Even with the compensator lens 54 the system cannot be used as a motion picture camera lens because the image produced by the erector is upright and in case of a positive compensator lens also virtual. It is therefore necessary to add the relay 55 which forms a real inverted image on the film 56 of the image produced by the compensator lens. This relay system which produces no magnification of its own, contains also the aperture stop of the system. Thereby, the exit pupil and thus the amount of light reaching the film is kept constant regardless of the movement of the variator barrel.

Though any good copying lens which combines a relatively short focal length with full correction for a one to one imagery can be used as a relay system I prefer a symmetrical lens arrangement with an even number of components, since this gives the advantage of parallel rays between the two middle elements. If only half a relay system with an equivalent focal length equal to the focal length of a standard motion picture objective is used the varifocal lens becomes an afocal system (both focal points at infinity). Such a system can be placed in front of any standard camera lens thereby converting the latter into a varifocal lens.

By applying well known optical laws, especially the theorem of Lagrange and the laws of Newton, Gauss, and Abbé I have found that range and image movement are determined solely by the angle under which parallel rays of light entering the optical system converge or diverge when forming the images. The equivalent focal length of any optical instrument is the quotient of the diameter of a pencil of parallel rays with the optical axis as centre ray divided by the final angle of convergence expressed in radians, the latter computed paraxially.

If the stationary front lens of the present system is exchanged for another one of different focal length spaced in such a way that its focal point coincides with the focal point of the previously used lens the angle of convergence remains the same. The diameter of the axial pencil of rays changes in direct proportion to the focal length of the stationary front lens, (geometrical relations of similar isosceles triangles). It follows therefore, that the absolute focal length of my optical system is directly proportional to the change of the focal length of the stationary front lens (numerator of the quotient changes while the denominator remains constant). Thus, if the front lens of a variator system covering the range from 17-51 mm. is exchanged for another lens with half its power the range covered by the system goes from 34-102 mm.

The data of a lens system embodying the present invention have already been given. It will be understood that these data are given by way of illustration only and not by way of limitation. It will also be understood that the specific construction of the lens holding members hereinabove described is also given solely by way of illustration and not by way of limitation. The requirement is simply that the variator and the compensator move as an integral unit relative to the front lens, erector and relay lens assemblies which themselves are fixed as a single unit. A lever has been shown and described as constituting the member by which the movable lens assemblies are moved relative to the fixed lens assemblies. It must be understood that this lever and the link construction to which it is connected are simply a preferred form of device for causing movement of the movable lens assemblies. Other well known mechanisms may be used to effect such movement.

I claim:

1. A varifocal lens construction for motion picture cameras, comprising a fixed outer barrel, a fixed inner barrel and a longitudinally movable intermediate barrel disposed between said outer and inner barrels, a front lens assembly and a rear relay lens assembly carried by said fixed outer barrel, an erector lens assembly carried by said fixed inner barrel, and a variator lens assembly and a compensator lens carried by said movable intermediate barrel, said variator lens assembly being disposed between said front and erector lens assemblies and said compensator lens being disposed between said erector and relay lens assemblies.

2. A varifocal lens construction for motion picture cameras, comprising a fixed outer barrel, a fixed inner barrel and a longitudinally movable intermediate barrel disposed between said outer and inner barrels, a front lens assembly and a rear relay lens assembly carried by said fixed outer barrel, an erector lens assembly carried by said fixed inner barrel, and a variator lens assembly and a compensator lens carried by said movable intermediate barrel, said variator lens assembly being disposed between said front and erector lens assemblies and said compensator lens being disposed between said erector and relay lens assemblies, said movable intermediate barrel being provided with means for moving said barrel longitudinally relative to the two fixed barrels.

3. A varifocal lens construction for motion picture cameras, comprising a fixed outer barrel, a fixed inner barrel and a longitudinally movable intermediate barrel disposed between said outer and inner barrels, a front lens assembly and a rear relay lens assembly carried by said fixed outer barrel, an erector lens assembly carried by said fixed inner barrel, and a variator lens assembly and a compensator lens carried by said movable intermediate barrel, said variator lens assembly being disposed between said front and erector lens assemblies and said compensator lens being disposed between said erector and relay lens assemblies, said fixed outer barrel and said movable intermediate barrel having an opening in their respective walls, a rigid member extending through the opening in the movable intermediate barrel and interconnecting said fixed outer and inner barrels and preventing relative movement between them, and means extending through the opening in the fixed outer barrel and connected to the movable intermediate barrel for causing relative movement between said movable and said fixed barrels.

4. A varifocal lens for motion picture or television cameras, comprising a front lens, a variator lens behind said front lens, an erector behind said variator lens, a compensator lens behind said erector lens, and a relay lens behind said compensator lens, said front lens, erector lens and relay lens being fixedly positioned relative to each other, said variator lens and compensator lens being fixedly positioned relative to each other, said front lens, erector lens and relay lens on the one hand, and said variator lens and compensator lens on the other hand, being movable relative to each other, and mechanical means connected to the front lens, erector lens and relay lens and also connected to the variator lens and compensator lens for providing such relative movement.

5. A varifocal lens for motion picture or television cameras, comprising a front lens, a variator lens behind said front lens, an erector lens behind said variator lens, a compensator lens behind said erector lens, and a relay lens behind said compensator lens, said front lens, erector lens and relay lens being fixedly positioned relative to each other, said variator lens and compensator lens being fixedly positioned relative to each other and being movable as an integral unit relative to said front lens, erector lens and relay lens, and mechanical means connected to the variator lens and compensator lens for moving said variator lens and compensator lens as an integral unit relative to the front lens, erector lens and relay lens.

6. A varifocal lens construction for motion picture or television cameras, comprising fixed lens holders and a movable lens holder, a front lens assembly, an erector lens assembly, and a relay lens assembly carried by said fixed lens holders, and a variator lens assembly and a compensator lens carried by said movable lens holder, said variator lens assembly being disposed between said front and erector lens assemblies, and said compensator lens being disposed between said erector and relay lens assemblies, and mechanical means mounted on the fixed lens holders and operatively connected to the movable lens holder for moving said movable lens holder relative to the fixed lens holders.

7. A varifocal lens construction for motion picture or television cameras, comprising a fixed outer barrel, a fixed inner barrel, and a longitudinally movable intermediate barrel disposed between said outer and inner barrels, a front lens assembly and a rear relay lens assembly carried by said fixed outer barrel, an erector lens assembly carried by said fixed inner barrel, and a variator lens assembly and a compensator lens carried by said movable intermediate barrel, said variator lens assembly being disposed between said front and erector lens assemblies and said compensator lens being disposed between said erector and relay lens assemblies, and mechanical means mounted on the fixed outer barrel and operatively connected to the movable intermediate barrel for causing relative movement of said intermediate barrel relative to the fixed outer and inner barrels.

FRANK G. BACK.

REFERENCES CITED

The following references are of record in the file of this patent:

UNITED STATES PATENTS

| Number | Name | Date |
|---|---|---|
| 1,790,232 | Flora | Jan. 27, 1931 |
| 1,898,471 | Walker | Feb. 21, 1933 |
| 2,130,347 | Holst et al. | Sept. 20, 1938 |
| 2,159,394 | Mellor et al. | May 23, 1939 |
| 2,165,341 | Capstaff et al. | July 11, 1939 |